(12) United States Patent
Luk

(10) Patent No.: US 7,594,047 B2
(45) Date of Patent: Sep. 22, 2009

(54) BUFFER CIRCUIT

(75) Inventor: King W. Luk, Elk Grove, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 92 days.

(21) Appl. No.: 11/825,739

(22) Filed: Jul. 9, 2007

(65) Prior Publication Data
US 2009/0019193 A1 Jan. 15, 2009

(51) Int. Cl.
G06F 3/00 (2006.01)
G06F 13/00 (2006.01)
(52) U.S. Cl. .................... 710/52; 710/31; 710/310
(58) Field of Classification Search ............ 710/52–61, 710/29–31, 310
See application file for complete search history.

(56) References Cited

U.S. PATENT DOCUMENTS

| 4,785,415 | A | * | 11/1988 | Karlquist | ............... 713/401 |
| 5,280,584 | A | * | 1/1994 | Caesar et al. | ............... 710/53 |
| 5,357,613 | A | | 10/1994 | Cantrell et al. | |
| 5,655,113 | A | * | 8/1997 | Leung et al. | ............... 713/401 |
| 5,867,672 | A | * | 2/1999 | Wang et al. | ............... 710/307 |
| 5,909,563 | A | | 6/1999 | Jacobs | |
| 6,052,757 | A | * | 4/2000 | Pedicone et al. | ............ 711/108 |
| 6,161,160 | A | | 12/2000 | Niu et al. | |
| 6,557,053 | B1 | * | 4/2003 | Bass et al. | ............... 710/29 |
| 7,035,983 | B1 | | 4/2006 | Fensore | |
| 7,187,741 | B2 | | 3/2007 | Pontius et al. | |
| 7,239,669 | B2 | | 7/2007 | Cummings et al. | |
| 7,254,677 | B1 | * | 8/2007 | Lowe et al. | ............... 711/118 |

* cited by examiner

Primary Examiner—Christopher B Shin

(57) ABSTRACT

Systems, devices, and methods, including logic and/or executable instructions are described in connection with a buffer circuit. One buffer circuit includes a flip-flop based first-in first-out (FIFO) buffer having an input and an output, selection logic coupled in series with the FIFO buffer input, and a random access memory (RAM) FIFO coupled in parallel with the selection logic. The selection logic diverts incoming data to the RAM FIFO after the FIFO buffer is filled to a first capacity level, and reloads the FIFO buffer using data from the RAM FIFO until the RAM FIFO is emptied to a second capacity level. Data is extracted without read data latency from the output of the FIFO buffer as an output of the buffer circuit.

20 Claims, 4 Drawing Sheets

BUFFER CIRCUIT

BACKGROUND

First-in first-out (FIFO) buffers, sometimes called queues, are building blocks for digital systems. Typical implementations include FIFOs built using flip-flops, or on-chip RAM arrays. Ongoing demands for more-complex circuits have led to significant achievements that have been realized through the fabrication of very large-scale integration of circuits on small areas of silicon wafer. These complex circuits are often designed as functionally-defined blocks that operate on a sequence of data and then pass that data on for further processing. This communication from such functionally-defined blocks can be passed in small or large amounts of data between individual integrated circuits (or "chips"), within the same chip, and between more remotely-located communication circuit arrangements and systems. Regardless of the configuration, the communication typically requires closely-controlled interfaces to insure that data integrity is maintained and that chip-set designs are sensitive to practicable limitations in terms of implementation space.

With the increased complexity of circuits, there has been a commensurate demand for increasing the speed at which data is passed between the circuit blocks. Many of these high-speed communication applications can be implemented using parallel data interconnect transmission in which multiple data bits are simultaneously sent across parallel communication paths. Such "parallel bussing" is a well-accepted approach for achieving data transfers at high data rates.

Many integrated circuits today include more than one clock, i.e., frequency, domain; therefore, a data-transmitting module might be operating in one clock domain at a first clock frequency, while a data-receiving module is operating in another clock domain at a different, and perhaps asynchronous, second clock frequency. The interface between clock domains is a clock domain boundary, or clock domain crossing, where information, e.g., data, crosses the boundary.

Implementing integrated circuits using a plurality of clock domains is desirable for a variety of reasons. Accordingly, improving data communication over parallel busses between clock domains, or between modules having different transport and receive rates, permit more practicable and higher-speed parallel bussing applications which, in turn, can directly lead to serving the demands for high-speed circuits while maintaining data integrity.

Even where transmitting and receiving modules reside in the same clock domain, the instantaneous rate at which data are transmitted may not match the instantaneous rate at which data are used (i.e., consumed). To accommodate data rate differences, a discrete buffering device is conventionally used between different clock domains, or between components having different transmit and receive rates. Data is clocked, i.e., inserted, into the buffering device according to a source domain or write clock, and clocked out, i.e., extracted, from the buffering device according to a receive domain or read clock.

DETAILED DESCRIPTION

Embodiments of the invention may include methods, systems, and executable instructions and/or logic associated with a buffer circuit which may be used for buffering data signals; for example, when crossing a clock domain boundary, or where instantaneous transmit and receive rates differ.

According to one embodiment, a buffer circuit includes a first-in first-out (FIFO) buffer having an input. Selection logic is coupled in series with the FIFO buffer input, and a random access memory (RAM) FIFO is coupled in parallel with the selection logic. The selection logic diverts incoming data to the RAM FIFO after the FIFO buffer is filled to a first capacity level, and reloads the FIFO buffer using data from the RAM FIFO until the RAM FIFO is emptied to a second capacity level. According to some embodiments, the data transit latency of the FIFO buffer is no larger than necessary to avoid data gaps on extraction of data due to the read data latency of the RAM FIFO.

Figure 1:
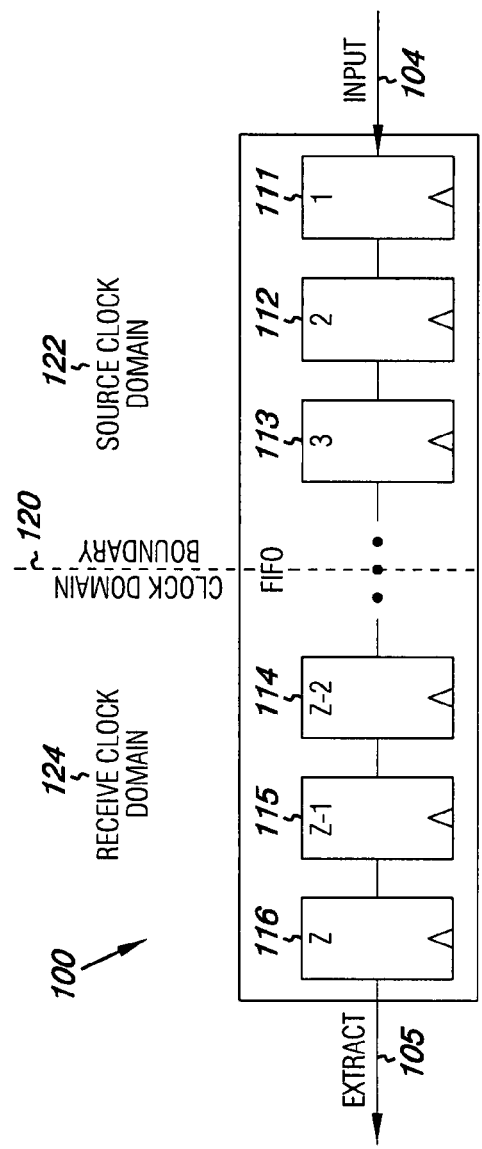
FIG. 1 illustrates a previous approach for a clock domain boundary crossing buffer.

FIG. 1 illustrates a previous approach for a clock domain boundary crossing buffer 100. A Z-stage, flip-flop based first-in-first-out (FIFO) is shown having a data input terminal 104 on its insertion, i.e., write, end and an extract terminal 106 on its extract, i.e., read, end. The write end of the data buffering arrangement accepts the data to be inserted into the FIFO, and the read end supplies data to be extracted from the FIFO. The Z stages forming the FIFO pipeline register consist of Z flip-flops, e.g., 111, 112, . . . , 116, and are shown crossing a clock domain boundary 120. The designator "Z" is used to indicate that a number of flops may be included within the FIFO. The quantity of flops, Z, comprising the FIFO is a compromise between data latency and buffer capacity.

Data originating from circuits within a source clock domain 122 are transmitted through the buffer 100 to circuits within a receive clock domain 124. Data written into the FIFO can be stored until the system on the output of the FIFO is ready to accept the data. Data is written into the buffer synchronous with a source clock (write clock) of the source clock domain 122, and read from the data buffering arrangement synchronous with a receive (read) clock of the receive clock domain 124. Generally, the source clock operates at a higher frequency than the receive clock such that data tends to periodically accumulate in the data buffer arrangement when being simultaneously written to, and read from, the buffer 100. The source and receive clock domains respectively use source and receive clocks which need not be synchronous between domains. Each clock domain might utilize a single clock frequency throughout the clock domain, or alternatively, include a plurality of synchronous clock signals. Each clock domain may be clocked independently from the other clock domains, and clock signals for each clock domain may not be synchronous with clock signals of the other clock domains. Each clock domain can include clock signals with frequencies not found in the other clock domains. The clock frequency of the receive clock domain may be slower or faster than the source clock domain, or the two clock domains may run at roughly the same frequency, but the clock phases across the clock domain boundary 120 may be unknown.

The clock domain from which data flows across the clock domain boundary 120 is referred to as a source clock domain, and the clock domain to which the data flows across the clock domain boundary is referred to as a receiving clock domain. For example in FIG. 1, data originates in the source clock domain 122, and (as indicated by the input terminal arrow direction) enters the FIFO by the input terminal 104. The data flows through the FIFO across the clock domain boundary 120, and subsequently out of the FIFO to circuits located in the receive clock domain 124 (again, as indicated by the directional arrow of the extract terminal 106). Depending on implementation, data may flow in one direction or both directions across clock domain boundary 120. Additional details of the FIFO storage element, and control thereof, generally follow well-known design practices for such data storage devices.

There are three competing aspects of a buffering device, such as the clock domain crossing FIFO shown in FIG. 1, capacity, latency and physical size. Capacity refers to the quantity of data that can be stored in the FIFO, latency refers to the time delay incurred for a unit of data to move across the FIFO, and physical size refers to the geographic footprint needed to physically implement the buffering device. The source clock generally operates at a higher frequency than the receive clock such that data tends to periodically accumulate in a data buffer arrangement when being simultaneously inserted into, and extracted from, the data buffering arrangement. Capacity of the data buffering arrangement is designed to balance physical size (and thus, cost) and latency against the amount of data that can be accumulated without interrupting operations needing to send data through the buffering arrangement. Increasing the quantity of data which can be temporarily stored in the buffer requires a physically larger buffer, resulting in greater manufacture cost, a larger circuit footprint, and longer data latency in serially moving data across the larger buffer. Longer transit data latency slows down operations in the receiving domain since communication speed between clock domains is reduced due to the in-route buffer latency delay, thereby causing the receive domain circuits to wait for data, and degrading overall system performance. Extended latency is particularly problematic in real-time data applications such as voice or video communications, where jerky or hesitant presentations can result from over-delayed data transmissions.

On the other hand, decreasing buffer size to save circuit real estate, to lower cost, or reduce latency, for example, risk a buffer being overwhelmed with data, causing the buffer to constantly become full, delaying acceptance of additional data, and thus serving as a communication bottleneck. The result is slowed operations in the source clock domain as circuits must wait for the buffer to empty before operations trying to write to the buffer can be completed.

Referring again to FIG. 1, the reader will appreciate the manner in which signals from one clock domain are input to a clock-crossing FIFO at a first clock frequency, and output according to another clock frequency. Data may be simultaneously written into and read out from the FIFO. Data written into the FIFO is sequentially read out in a pipelined manner.

Data is written into the buffer as space permits, e.g., into the first available flop 111, and subsequently into the other flops, e.g., 112, 113, ..., 114, 115, and 116, on respective subsequent source clock cycles. A write pointer (not shown) tracks the next write location within the FIFO. Data is extracted, i.e., clocked-out, from the buffer output 105 according to the receive clock. A read pointer (not shown) tracks the read location within the FIFO for the next extraction. One skilled in the art will appreciate that a Z-stage, flip-flop based FIFO is a latency-efficient, i.e., low latency, buffering structure. Extraction from the FIFO does not involve additional clock cycles of latency. However, the drawback to this type of FIFO buffer is the relatively larger chip die area required to implement a FIFO using flip-flops compared to other FIFO structure options.

Figure 2:
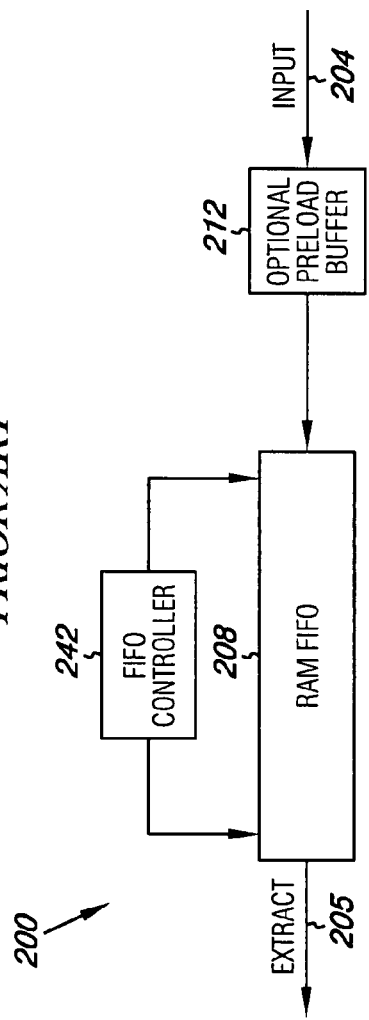
FIG. 2 illustrates a previous approach for a RAM-based FIFO.

FIG. 2 illustrates another previous buffer approach. A buffer 200 includes a random access memory (RAM)-based FIFO 208, with an optional preload buffer 212. Data is written into the data buffer 200 at an input end 204, and data is read from the buffer 200 at an extract end 206. A FIFO controller 242 is coupled to the RAM FIFO 208 for managing data flow, i.e., read/write operations, into and out of the RAM FIFO 208. A RAM FIFO utilizes more circuit area, is more expensive to manufacture, and requires more complex control circuitry, e.g., FIFO controller 208, than the flop-based FIFO illustrated in FIG. 1.

Read data latency is the delay in reading data from a memory structure, e.g., a flip-flop based FIFO or RAM. A conventional RAM-based FIFO suffers from a minimum of 2 cycles of data read latency upon data extraction. The flip-flop based FIFO, discussed above in conjunction with FIG. 1, does not suffer from read data latency since data is clocked out of the flip-flop based FIFO without delay, e.g., on the next clock cycle, when reading from the flip-flop based FIFO. The additional read data latency associated with a RAM based FIFO can be a significant issue for processor-based designs, or applications having low latency requirements. For these and other reasons, the RAM-based FIFO buffer 200 can be a comparatively slow and expensive buffer solution.

Figure 3:
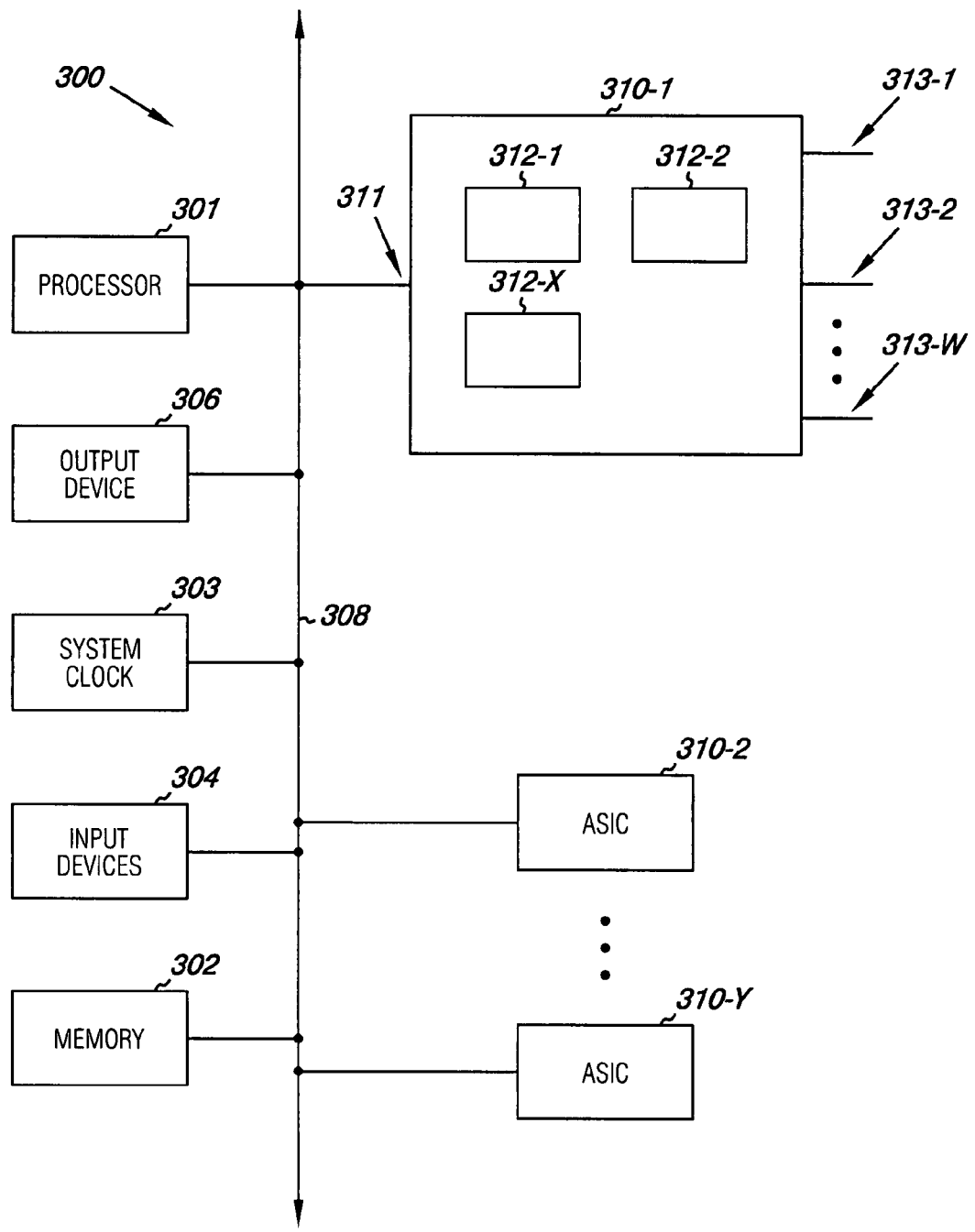
FIG. 3 illustrates a block diagram for a computing system environment including a number of ASICs.

FIG. 3 illustrates a block diagram for a computing system environment including a number of application specific integrated circuits (ASICs). As shown in FIG. 3, an example embodiment of a computing system 300 can include one or more system processors 301, one or more memories 302, one or more system clocks 303, one or more input devices 304, and one or more output devices 306. Such components can be connected together via a system bus 308. One of ordinary skill in the art will appreciate the quantity, variety, and types of such components as may be included in a computing system. Additional detail is omitted from FIG. 3 so as not to obscure the embodiments of this disclosure.

As shown in the example embodiment of FIG. 3, a number of ASICs, 310-1, 310-2, ..., 310-Y, may be included in the computing system 300. The designator "Y" is used to indicate that a number of ASICs may be included with a given computing system 300. A given ASIC, e.g., 310-1, can include a number of different clock domains, 312-1, 312-2, ..., 312-X, having similar and/or dissimilar clock frequencies. The designator "X" is used to indicate that a number of different clock domains may be included with a given ASIC, e.g., ASIC 310-1. On ASIC 310-1 each of the "X" different clock domains can have a different clock associated therewith. So, for example, one clock domain 312-1 may have a different clock frequency from another clock domain, e.g., 312-2. The clock associated with clock domain 312-2 may again be different from the clock associated with clock domain 312-X. At the same time, a clock associated with a given clock domain may be equivalent to the clock used in another clock domain, but different clock domains may have an unknown, or unsynchronized, clock phase alignment. Where data passes between clock domains having different frequencies, or having different or unknown phase relationships, a clock-crossing FIFO buffering device (not shown), as described in more detail below, may be used to treat the signals passing between clock domains. Embodiments are not limited to the examples described here in connection with computing system 300 and/or ASIC 310-1.

As shown in FIG. 3, example ASIC 310-1 includes one or more inputs connected to the bus 308, shown generally for ease of illustration as 311. Additionally, example ASIC 310-1 may include a number of I/O pins, or ports, e.g., 313-1, 313-2, ..., 313-W, which can be connected to other components or circuits. The designator "W" is used to indicate that a number of I/O pins or ports (hereinafter referred to as "ports") may be included with a given ASIC, e.g., example ASIC 310-1. ASICs 310-2, ..., 310-Y, can include similar circuit configurations to that discussed in connection with ASIC 310-1. Embodiments of the present invention are not limited to the example illustration provided in FIG. 3. Signals from one, or a few of these clock domains, principally the main or core clock domain, e.g., 312-1, and several other clock domains, may be pipelined or routed to the a particular I/O port. A clock-crossing FIFO buffering device, as described in more detail below, may be used to treat the signals passing into, or out of, certain ASIC ports.

Figure 4:
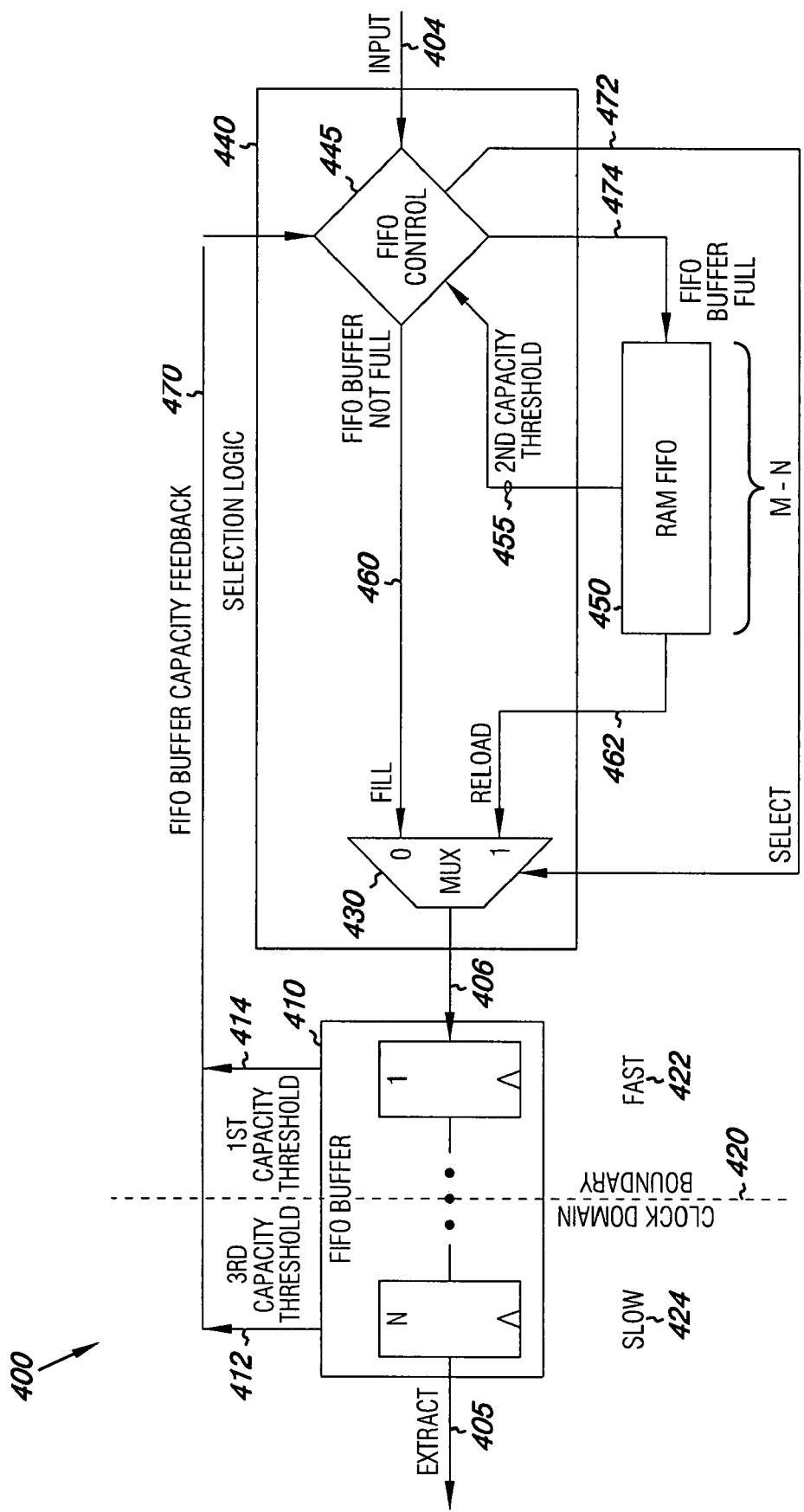
FIG. 4 illustrates an embodiment of a buffer circuit according to embodiments of the present invention.

FIG. 4 illustrates a data buffering arrangement 400 (hereinafter a buffer circuit) according to an embodiment of the present invention. The buffer circuit 400 has an input 404 and an extraction output 405, and is shown crossing a clock domain boundary 420. However, embodiments of the present invention may be implemented entirely within a singular clock domain, such as is shown by the embodiment of the present invention illustrated in FIG. 5. The clock domain boundary 420 resides between a fast clock region 422 and a slow clock region 424. With respect to the two clock regions, data can be written into the buffer circuit 400 at a faster rate from the fast clock region 422 than the rate at which data can be extracted according to the clock of the slow clock region 424. Therefore, data will tend to accumulate in the buffer circuit 400 during simultaneous insert and extract operations.

Buffer circuit 400 includes a flip-flop based staging FIFO 410 (hereinafter a FIFO buffer) connected in series with selection logic 440. The output of the selection logic 440 is coupled to the input 406 of the FIFO buffer 410. A RAM-based overflow FIFO 450 (hereinafter RAM FIFO) is connected in parallel with a portion of the selection logic 440, such that the selection logic 440 can direct data received at its input 404 to either the FIFO buffer 410 or the RAM FIFO 450.

The FIFO buffer 410 is a flip-flop based, asynchronous, pipeline register that includes N stages of flip-flops. FIFO buffer 410 has a data input terminal 406 and an extract terminal 405. Typically, pointers (not shown) are associated with each respective terminal, a write pointer with the data input terminal 406 and a read pointer with the extract terminal 405. The extract terminal 405 of the FIFO buffer 410 is also the output, i.e., extract terminal, of the buffer circuit 400. Since there is no read data latency for a flip-flop based FIFO buffer, as there is for a RAM buffer, there is no read data latency for the combined buffer circuit 400. In interfacing a flip-flop based FIFO with a RAM based FIFO in the manner illustrated in the embodiments of the present invention described, buffer circuit 400 simultaneously achieves the majority of efficient circuit space utilization associated with a RAM buffer structure and the low data read latency of a flip-flop buffer structure. Those skilled in the art will appreciate that interfacing the extract end of buffer circuit 400 to circuits and systems is greatly simplified due to the absence of read data latency from buffer circuit 400, i.e., there is no unproductive clock delay in extracting data therefrom. Buffer circuit 400 is capable of supporting a flip-flop interface with other circuits and systems.

FIFO buffer 410 includes at least one capacity level threshold, for example as shown in FIG. 4, a first capacity threshold 414, e.g., at full capacity or almost full capacity, and a third capacity threshold 412, e.g., at an empty or nearly empty or not full capacity. Capacity thresholds and/or status information, e.g., flags, need not be physical implementations, but rather may be logically implemented, e.g., quantity of data contained in the FIFO buffer 410 determined from the differences between read and write pointers, etc. The capacity level thresholds of the FIFO buffer 410 are communicated back to the FIFO control 445 via a FIFO buffer capacity feedback 470. The FIFO buffer capacity level thresholds are used in the switching logic executed by the FIFO control 445 in selecting one of the FIFO buffer 410, or the RAM FIFO 450, to which incoming data is directed.

The selection logic 440 includes a FIFO control 445 and a multiplexer 430, with a first output 460 of the FIFO control 445 being coupled to a first input of the multiplexer 430. The FIFO control 445 effectively functions as a switch controlled by switching logic for selectably directing data received at an input 404 to one of two outputs. The particular output is selected by the switching logic of the FIFO control 445 is based on the quantity of data in each of the FIFO buffer 410 and the RAM FIFO 450. The switching logic directs data to a first output 460, e.g., FIFO BUFFER NOT FULL, when the FIFO buffer 410 is not full, and directs data to a second output 474, e.g., FIFO BUFFER FULL, after the FIFO buffer 410 is filled to a first capacity level 414. The second output 474 is coupled to the input of the RAM FIFO 450. An output 462 of the RAM FIFO 450 is coupled to a second input, e.g., RELOAD, of the multiplexer 430. A second capacity threshold 455, e.g., an "empty" indication or "empty" status flag, of the RAM FIFO 450 is communicated, logically through information or physically by signal, to the FIFO control 445 as an input to the switching logic.

Only when the FIFO buffer 410 is not "full" and the RAM FIFO 450 is "empty" does data received at input 404 get directed to the first output 460, e.g., FIFO BUFFER NOT FULL, of the FIFO control 445, which is coupled to a first input, e.g., FILL, of the multiplexer 430. The terms "full" and "empty" used herein in referring to certain capacity levels of the FIFO buffer and RAM buffer do not necessarily indicate that the respective FIFOs are literally full or empty since the corresponding thresholds may be set at almost full, or nearly empty, as appropriate. When the FIFO buffer 410 is "full", e.g., the quantity of data is above the first capacity level 414, or the RAM FIFO 450 is not "empty", e.g., not below the second capacity level 455 (and of course, the RAM FIFO is also not full), data received at input 404 is directed to the second output 474, e.g., FIFO BUFFER FULL, of the FIFO control 445, which is coupled to the input of the RAM FIFO 450. Once data is diverted to the RAM FIFO 450, data continues to be diverted to the RAM FIFO 450 until the RAM FIFO 450 is emptied. For example, if data received at input 404 slows or stops, the differential insert/extract rate tends to empty the RAM FIFO 450 of data. Once data is diverted to the RAM FIFO 450, the FIFO buffer 410 is reloaded from the RAM FIFO 450 until RAM FIFO 450 is emptied. In addition, the FIFO buffer 410 has to have capacity available to accept additional data. At that time, the switching logic of the FIFO control 445 will direct incoming data, received at input 404, to the first output 460, e.g., FIFO BUFFER NOT FULL, of the FIFO control 445 once again.

The switching logic of the FIFO control 445 also controls the input select 472 of the multiplexer 430. The multiplexer 430 is effectively a switch arranged to direct data received at one of two inputs to the output of the multiplexer 430. The particular input is selected by the FIFO control 445 based on the quantity of data in each of the FIFO buffer 410 and the RAM FIFO 450. When no data is present in the RAM FIFO 450, i.e., the RAM FIFO 450 is "empty," the switching logic of the FIFO control 445 selects the first, e.g., FILL, multiplexer input to pass data thereon through the multiplexer 430, and on to the FIFO buffer 410. As the reader will appreciate, the FIFO buffer 410 is filled from the data received at input 404 without any intentional delay. When data is present in the RAM FIFO 450, i.e., the RAM FIFO 450 is not "empty," the switching logic of the FIFO control 445 selects the second input, e.g., RELOAD, of the multiplexer 430 to pass data through the multiplexer 430, and on to the FIFO buffer 410. Once data is stored in the RAM FIFO 450, the FIFO buffer 410 is reloaded from RAM FIFO 450 rather than directly from the buffer arrangement input 404. Reloading the FIFO buffer 410 from RAM FIFO 450 continues until the RAM FIFO 450 is emptied and the FIFO buffer 410 has available capacity to accept data, e.g., its capacity is at or below the third capacity threshold (assuming some hysteresis is needed or desired before filling the FIFO buffer 410). As the reader will appreciate, selecting a different multiplexer input is avoided until no extraction is pending from the RAM FIFO 450 in order to prevent in-flight extraction, and corresponding data sequence corruption.

Initially, data received at the buffering arrangement is directed right to the FIFO buffer 410 until the FIFO buffer 410 reaches an upper capacity limit, e.g., the first capacity threshold 414. Since data generally tends to accumulate in the data buffer arrangement 400, whether due to clock domain crossing or other insert/extract data rate discrepancies, it is expected that the FIFO buffer 410 will become filled from time-to-time. Once the FIFO buffer 410 cannot accept the next unit of data, the FIFO buffer 410 signals the FIFO control 445, e.g., using the first capacity level threshold 414 and feedback 470, to start diverting incoming data to the RAM FIFO 450. As the FIFO control 445 diverts data to the RAM FIFO 450, the FIFO control 445 also selects the RELOAD input of the multiplexer 430 (no RAM extraction should be pending), such that the FIFO buffer 410 will subsequently be reloaded using data temporarily stored in the RAM FIFO 450. Reloading the FIFO buffer 410 from the RAM FIFO 450 continues until the RAM FIFO 450 is emptied. One having ordinary skill in the art will appreciate that in order to maintain the sequence order of the incoming data, reloading the FIFO buffer 410 from the RAM FIFO 450 must continue until the sequence of data within the RAM FIFO 450 is exhausted.

As data is extracted from the FIFO buffer 410, and reloaded from the RAM FIFO 450, if the differential, i.e., input/extract, data rate slows or ceases, the RAM FIFO 450 can empty, and at some capacity level, e.g., the second capacity threshold 455 set at empty or almost empty, the RAM FIFO 450 will signal, e.g., by an appropriate status flag, the FIFO control 445 that the RAM FIFO is nearly, or completely, empty.

Once the RAM FIFO 450 is empty, and the FIFO buffer 410 is also emptied to a capacity at which it is able to accept additional data, e.g., capacity at or below the third capacity level 412 or capacity no longer at or above the first capacity threshold, the FIFO control 445 stops diverting incoming data to the RAM FIFO 450 and selects the multiplexer 430 to pass data to its output from the FILL input. Thus, data received at the input 404 to the buffer arrangement 400 is passed without delay to the FIFO buffer 410 once again. As one skilled in the art will appreciate, the multiplexer 430 select will not be changed if an extract from the RAM FIFO 450 is still pending, so as not to disrupt an in-progress extraction. Forwarding data received at the input 404 directly to the FIFO buffer 410, i.e., not diverting data through the RAM FIFO 450, continues until such time as the FIFO buffer 410 again fills, at which time incoming data is once more diverted to the RAM FIFO 450 by the FIFO control 445 as previously discussed.

As described above, the first capacity level threshold 414 of the FIFO buffer 410 is communicated to the FIFO control 445 to signal that subsequent incoming data should no longer be inserted into the FIFO buffer 410, and should soon be diverted to and inserted in, the RAM FIFO 450. The first capacity level threshold 414 is set at a capacity level intended to prevent overflow of the FIFO buffer before the incoming data can be diverted to, and begun to be inserted in, the RAM FIFO, i.e., with lead time necessary at certain input data rates to allow for logic processing and switching operations The exact capacity level of the FIFO buffer 410 at which this first capacity level threshold 414 should be implemented can depend on the size of the FIFO buffer 410, the differential insertion/extraction rates, maximum extraction rate, propagation and operational latency of the FIFO control 445, and other components of the buffer circuit 400. The first capacity level threshold 414 may be set to be satisfied when the FIFO buffer 410 is full, e.g., 100%, or nearly full, or at some other selected level such as at least eighty percent (80%) at which it is desirable to divert incoming data prior to overflowing the FIFO buffer 410, e.g., allowing for an appropriate amount of switching lead time. Embodiments are not limited to the examples, e.g., percentages, given above.

Similar criteria and considerations can be applicable in setting the third capacity threshold 412 of the FIFO buffer 410. It may be set to indicate when the FIFO buffer 410 is empty to a particular extent, e.g., 100% empty, or at some level prior to being 100% empty, for example, at least eighty percent (80%) empty, to provide an indication of the FIFO buffer 410 being near empty ahead of the FIFO buffer 410 actually being entirely empty to allow the selection logic 440 to adjust its configuration accordingly without unnecessary data throughput delay. If hysteresis properties are not desired in filling and emptying the FIFO buffer, than the absence of the first capacity threshold 414 indication can be used to indicate the FIFO buffer not being full, and thus able to accept additional data. If hysteresis is desired, than the third capacity threshold 412 can be set to a capacity level less than the first capacity threshold 414.

Likewise, the first capacity threshold 455 of the RAM FIFO 450 may be set to indicate, e.g., by an "empty" indication or status flag, when the RAM FIFO 450 is empty, e.g., 100% empty, or at some level just prior to being completely empty to allow for lead time in switching logic and implementation.

The buffer circuit 400 is a low latency FIFO with a total capacity of M entries, including the capacity of the FIFO buffer 410 and the RAM FIFO 450. The designator "M" is used to indicate that a number of entries may be included within the buffer circuit 400. The FIFO buffer 410 is an N-entry flip-flop based, asynchronous, FIFO. The designator "N" is used to indicate that a number of flops may be included within the FIFO buffer 410. It follows that the RAM FIFO 450 is a (M-N)-deep RAM, as indicated in FIG. 4. M and N are selected such N is relatively small to minimize physical chip area, and M is much greater than N to provide buffer capacity sufficient to store the expected data accumulation in the data buffer arrangement 400 commensurate with the application in which the data buffer arrangement 400 is being utilized. Thus, most of the storage capacity of the buffer circuit 400 is contained in the capacity of the RAM FIFO 450.

The value of N, i.e., the FIFO buffer 410 size, is chosen as a function of the RAM read data latency (assuming one entry can be extracted per clock cycle from the FIFO buffer 410). Therefore, the number entries, N, of the FIFO buffer 410 should be at least one greater than the number of clock cycles of read data latency of the RAM FIFO 450 (again, assuming one entry can be extracted per clock cycle from the FIFO buffer 410). It is preferable for N to be selected such that maximum data latency of the FIFO buffer 410 is only slightly longer than the read data latency of the RAM FIFO 450. The maximum data latency of the FIFO buffer 410 is the greatest number of clock cycles it will take for a particular unit of stored data to exit the FIFO buffer 410. This typically occurs for the last unit of data is added to completely fill the FIFO buffer. For example, it will take N clock cycles for the Nth unit of data in an N-entry FIFO buffer to exit the FIFO buffer. Those skilled in the art will appreciate it is the receive domain clock frequency by which maximum data latency of the FIFO buffer 410 is measured since the reference point of interest is the read, i.e., extract, operation latency.

According to one embodiment of the present invention, a RAM having a 2 cycle read data latency is used for the RAM FIFO 450, and the FIFO buffer 410 is implemented to be a 3-entry FIFO, where three clock cycles of maximum data latency in the FIFO buffer 410 is sufficient to ride through reloading the FIFO buffer 410 from the RAM FIFO 450, including the read data latency of the RAM FIFO 450, and still avoid data gaps on extraction of data from the FIFO buffer 410. The FIFO buffer 410 has sufficient data capacity to not run out of data while waiting for more data to be reloaded from the RAM FIFO 450, including the time delay associated with the latency in reading data from the RAM FIFO (during which data may continue to be clocked out of the FIFO buffer 410). However, there may be other design reasons to increase the FIFO buffer 410 capacity beyond that necessary to overcome the RAM FIFO 450 read data latency, particularly with respect to the application in which the buffer 400 is applied, e.g., inherent latency in crossing a frequency domain boundary. Those skilled in the art will appreciate in certain applications, the FIFO buffer 410 might be sized larger than minimally greater than the read data latency of the RAM FIFO 450 such that the FIFO buffer 410 will not underflow at the highest extract rate.

According to one example embodiment of the present invention utilized in a particular clock domain crossing, the FIFO buffer 410 is implemented as an 8-entry FIFO, and the RAM FIFO 450 is implemented with a 32 entry deep RAM. The need for an 8 entry deep flip-flop based FIFO buffer is due to inherent latency in clock domain crossing applications. According to another example embodiment of the present invention not utilized in a clock domain crossing application, the FIFO buffer 410 is implemented as at most a 4-entry flip-flop based FIFO.

One aspect of various embodiments of the present invention is that the read latency of the RAM is "masked" by the small FIFO buffer 410, which is sized to have slightly more latency due to the quantity of flop stages than the read data latency of the RAM of the overflow FIFO 450, to permit data extraction during the period of read latency of the RAM of the overflow FIFO 450. The reader will appreciate that the FIFO buffer 410 is filled before data is diverted to the RAM FIFO 450, and that data in the FIFO buffer 410 continues to be clocked out, i.e., extracted, from the FIFO buffer 410 during the read data latency period of the RAM of the overflow FIFO 450 as data is read back out from the RAM FIFO 450 to reload the FIFO buffer 410. Because the FIFO buffer 410 is sized to have a latency that is just a little longer than the data read latency of the RAM, and as the FIFO buffer 410 has room to accept data read from the RAM FIFO 450, data will be available from the RAM FIFO 450 before, and preferably just before, the FIFO buffer 410 is emptied. Increasing the size of the FIFO buffer 410 will increase latency of the buffer circuit 400 from the above-described optimal design configuration. Decreasing the size of the FIFO buffer 410, e.g., to have latency less than the read data latency of the RAM, will result in gaps in the data as the FIFO buffer 410 will empty before additional data can be read from the RAM FIFO 450.

One having ordinary skill in the art will appreciate that the hybrid flip-flop and RAM based embodiment of the present invention is optimal for applications requiring a large FIFO implementation, but with low latency. The small flip-flop based FIFO portion, e.g., FIFO buffer 410, of the buffer circuit 400 provides fast throughput and easy interface to other circuitry. The substantial RAM FIFO 450 portion of the buffer circuit 400 provides the desired buffering capacity, but with low circuit density and avoiding large throughput latencies associated with large flip-flop based FIFOs. Assembled together as disclosed herein, a buffer circuit 400 according to embodiments of the present invention provides a high capacity, low latency, buffer circuit adaptable to a wide range of buffering applications. Embodiments of the present invention may be adaptive to varying RAM latency specifications, for example by appropriately selecting the quantity, N, of FIFO buffer entries. Embodiments of the present invention are not limited to the examples described here in connection with buffer circuit 400, or the example illustration provided in FIG. 4.

Figure 5:
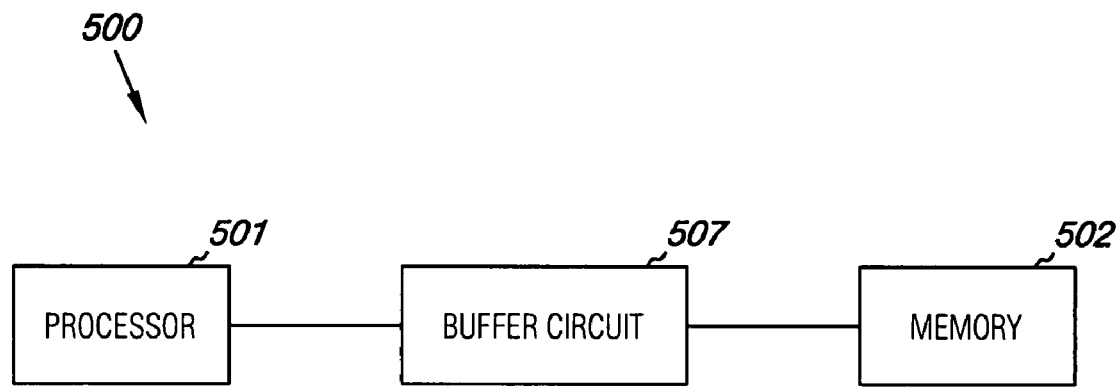
FIG. 5 illustrates an embodiment of a computing system including a buffer circuit according to embodiments of the present invention.

FIG. 5 illustrates an embodiment of a computing system 500, including a buffer circuit 507, having a FIFO buffer with a RAM FIFO according to embodiments of the present invention. Computing system 500 includes a processor 501 in communication with a memory 502. According to one example embodiment, the buffer circuit 507 is communicatively coupled to each of the processor 501 and the memory 502. The processor 501 may be communicatively coupled to additional system components and circuits that one having ordinary skill in the art will understand comprise a computing system, but which are not described in detail or shown in FIG. 5 so as not to obscure the described features of the claimed subject matter.

One having ordinary skill in the art will appreciate that processor 501 executes instructions to operate on, and manipulate, data in various ways. One routine operation is to request data from memory 502 upon which some action will be taken by the processor 501. The processor 501 sends a request to the memory 502 for data. Depending on a number of factors, some delay can occur before the data is retrieved and transmitted to the processor 501. In the mean time, the processor 501 may be utilized in other computations and data manipulations such that it is busy at the instant the particular data requested from memory 502 is available to the processor 501. Thus, efficient utilization of the processor 501 can cause delays in the process of retrieving data from the memory 502, perhaps tying up the memory 502 from servicing other data requests efficiently.

One solution is to provide a buffer intermediate in the data path from the memory 502 to the processor 501, such that if the processor 501 is busy and cannot immediately use the stream of data retrieved from memory 502, the intermediate buffer can temporarily hold the requested data until the processor 501 is free and able to accept the data as it is extracted from the buffer. By temporarily placing the requested data in an intermediate buffer, the memory 502 is free to process other requests sooner.

According to an embodiment of the present invention illustrated in FIG. 5, the buffer circuit 507 is arranged within the computing system 500 such that data being transported from the memory 502 to the processor 501 passes through the buffer circuit 507. For example, the buffer circuit 507 may be physically located in the communication path between the memory 502 and the processor 501, as shown in FIG. 5. However, as the reader will appreciate, in computing systems the buffer circuit 507 need not be physically located between the two components requiring data buffering (as shown), but may be located therebetween logically.

According to another example embodiment of the present invention, the buffer circuit 507 is arranged within the computing system 500 such that if the processor 501 is too busy to immediately accept requested data from memory 502, memory 502 sends the requested data to the buffer circuit 507 until it can be subsequently extracted therefrom by the processor 501.

Figure 6:
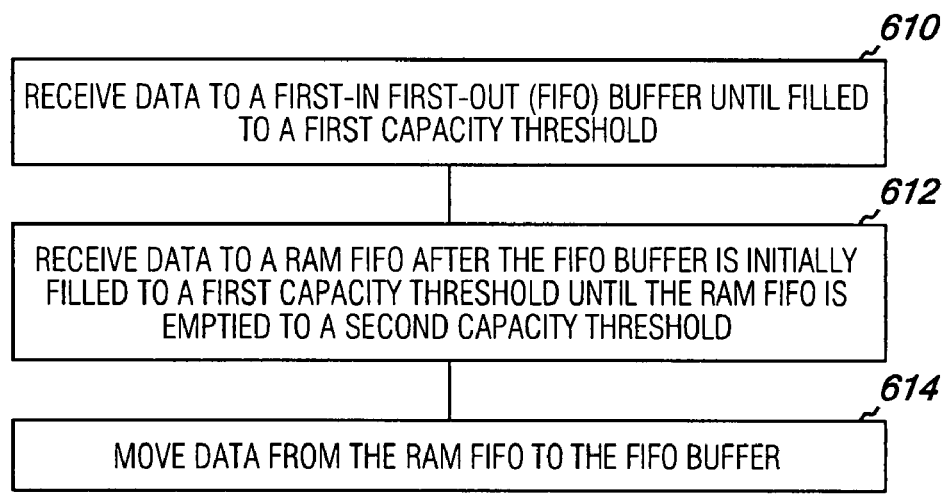
FIG. 6 illustrates a method embodiment for low latency buffering according to embodiments of the present invention.

FIG. 6 illustrates a method embodiment for low latency buffering data buffering. The method includes receiving data to a first-in first-out (FIFO) buffer until filled to a first capacity threshold, as shown at block 610. Block 612 illustrates receiving data to a RAM FIFO after the FIFO buffer is initially filled to the first capacity threshold until the RAM FIFO is emptied to a second capacity threshold. The method further includes moving data from the RAM FIFO to the FIFO buffer, as illustrated at block 614.

The logic, which is operable to perform the method described in connection with FIG. 6 can be present in whole or in part in embodiments of other Figures, e.g., in the buffer circuit 400 of FIG. 4, and the computing system 500 of FIG. 5. Embodiments, however, are not limited to the examples given herein.

Embodiments of the present disclosure include systems, circuits and methods for data buffering. As the reader will appreciate, various embodiments described herein can be performed by software, application modules, application specific integrated circuit (ASIC) logic, computer system, discrete components and/or executable instructions operable on the systems and devices shown herein or otherwise. "Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc. An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

The embodiments of the present disclosure may be implemented in a stand-alone computing system or a distributed computing system. As such, FIGS. 1-6 are intended to provide a context for the description of the functions and operations of the present disclosure. Logic, suitable for carrying out embodiments of the present invention, can be resident in one or more devices or locations or in several devices and/or locations in a network.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A buffer circuit, comprising:
a flip-flop based first-in first-out (FIFO) buffer having an input and an output;
selection logic coupled in series with the FIFO buffer input;
a random access memory (RAM) FIFO coupled in parallel with the selection logic;
wherein the selection logic is to divert incoming data to the RAM FIFO after the FIFO buffer is filled to a first capacity level such that once the FIFO buffer is filled to the first capacity level the incoming data is no longer sent directly to the FIFO buffer, is to reload the FIFO buffer using data from the RAM FIFO until the RAM FIFO is emptied to a second capacity level, and is to again begin sending the incoming data directly to the FIFO buffer after the FIFO buffer has been emptied to a third capacity level less than the first capacity level and greater than zero;
wherein the selection logic comprises:
a multiplexer communicatively connected to an input of the FIFO buffer and to an output of the RAM FIFO;
a non-multiplexer control to control diversion of the incoming data to the RAM FIFO such that the multiplexer does not control diversion of the incoming data to the RAM FIFO; and
wherein data is extracted without read data latency from the output of the FIFO buffer as an output of the buffer circuit.

2. The buffer circuit of claim 1, wherein the RAM FIFO has a read data latency of N−1 clock cycles, and the FIFO buffer has a capacity of at least N entries.

3. The buffer circuit of claim 2, wherein the RAM FIFO has a read data latency of N−1 clock cycles, and the FIFO buffer has a capacity of no more than N entries.

4. The buffer circuit of claim 2, wherein the capacity of the FIFO buffer is no larger than necessary to avoid data gaps on extraction of data due to the read data latency of the RAM FIFO.

5. The buffer circuit of claim 1, wherein the FIFO buffer is a single and an only FIFO buffer within the buffer circuit.

6. The buffer circuit of claim 1, wherein the first capacity threshold is set to prevent an overflow of the FIFO buffer before the incoming data is diverted to the RAM FIFO.

7. The buffer circuit of claim 6, wherein the first capacity threshold is one hundred percent (100%) of the FIFO buffer capacity, and the second capacity threshold is zero percent (0%) of the RAM FIFO capacity.

8. A computing system, comprising:
   a processor;
   a memory in communication with the processor; and
   a buffering device arranged in a communication path from the memory to the processor, the buffering device having a first-in first-out (FIFO) buffer and a random access memory (RAM) FIFO selectably connected in series with the FIFO buffer;
   wherein the RAM FIFO is selected to be serially connected ahead of the FIFO buffer after the FIFO buffer is filled to a first capacity threshold until the RAM FIFO is emptied to a second capacity threshold such that once the FIFO buffer is filled to the first capacity threshold incoming data is no longer sent directly to the FIFO buffer, and where the FIFO buffer is serially connected ahead of the RAM FIFO after the FIFO buffer has been emptied to a third capacity threshold less than the first capacity threshold and greater than zero, and
   wherein the buffering device comprises:
      a multiplexer communicatively connected to an input of the FIFO buffer and to an output of the RAM FIFO;
      a non-multiplexer control to control diversion of the incoming data to the RAM FIFO such that the multiplexer does not control diversion of the incoming data to the RAM FIFO.

9. The computing system of claim 8, wherein the capacity of the FIFO buffer is not larger than necessary to avoid data gaps on extraction of data due to the read data latency of the RAM FIFO.

10. The computing system of claim 9, wherein the RAM FIFO has a read data latency of Z clock cycles, and the FIFO buffer has a capacity of Z+1 entries.

11. The computing system of claim 8, wherein the first capacity threshold ranges from eighty to one hundred percent (80-100%) of the FIFO buffer capacity, and the second capacity threshold ranges from twenty to zero percent (20-0%) of the RAM FIFO capacity.

12. A method of buffering data, the method comprising:
   receiving data to a first-in first-out (FIFO) buffer of a buffer circuit until initially filled to a first capacity threshold such that once the FIFO buffer is filled to the first capacity level the data is not directly received to the FIFO buffer;
   receiving data to a RAM FIFO of the buffer circuit after the FIFO buffer is initially filled to a first capacity threshold until the RAM FIFO is emptied to a second capacity threshold;
   removing data from the RAM FIFO to the FIFO buffer; and,
   begin again receiving data to the FIFO buffer after the FIFO buffer has been emptied to a third capacity level less than the first capacity level and greater than zero.

13. The method of claim 12, wherein the maximum FIFO buffer data transit latency is one clock cycle greater than the read data latency of the RAM FIFO.

14. The method of claim 12, wherein the method further comprises extracting data from the FIFO buffer in the same order as data was received to the FIFO buffer and RAM FIFO.

15. The method of claim 12, wherein the first capacity threshold is at least eighty percent (80%) of the FIFO buffer capacity, and the second capacity threshold is at most twenty percent (20%) of the RAM FIFO capacity.

16. The method of claim 12, wherein the second capacity threshold is arranged such that there is no intentional delay in receiving data to the FIFO buffer after all data is removed from the RAM FIFO.

17. The method of claim 12, wherein the method further includes comprises extracting data from the FIFO buffer according to a receive domain clock; and
   wherein data is received to the FIFO buffer and RAM FIFO according to a source domain clock having a lower frequency than the receive domain clock.

18. The method of claim 12, wherein the method further comprises:
   extracting data from the FIFO buffer; and
   providing feedback of the first capacity threshold to a switching circuit having logic to direct incoming data to one of the FIFO buffer and the RAM FIFO based on the feedback.

19. The computing system of claim 8, wherein the FIFO buffer is a single and an only FIFO buffer within the buffering device.

20. The method of claim 12, wherein the FIFO buffer is a single and an only FIFO buffer within the buffer circuit.

* * * * *